(12) United States Patent
Borgatti et al.

(10) Patent No.: US 8,925,710 B2
(45) Date of Patent: Jan. 6, 2015

(54) TRANSFER DEVICE

(75) Inventors: Maurizio Borgatti, Imola (IT); Paolo Dalle Vacche, Sant' Agata sul Santerno (IT); Massimo Morovingi, Imola (IT); Fiorenzo Parrinello, Medicina (IT); Emilio Re, Ancona (IT); Gabriele Stocchi, Parma (IT); Andrea Zanardi, Felino (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 303 days.

(21) Appl. No.: 13/124,576
(22) PCT Filed: Jun. 28, 2010
(86) PCT No.: PCT/IB2010/052936
§ 371 (c)(1),
(2), (4) Date: Apr. 15, 2011

(87) PCT Pub. No.: WO2011/001356
PCT Pub. Date: Jun. 1, 2011

(65) Prior Publication Data
US 2011/0299967 A1 Dec. 8, 2011

(30) Foreign Application Priority Data
Jun. 30, 2009 (IT) .............................. BO2009A0418

(51) Int. Cl.
| B65G 29/00 | (2006.01) |
| B65G 47/86 | (2006.01) |
| B29C 49/42 | (2006.01) |
| B29C 49/06 | (2006.01) |
| B29C 49/36 | (2006.01) |

(52) U.S. Cl.
CPC .......... *B65G 47/847* (2013.01); *B29C 49/4205* (2013.01); *B29C 49/06* (2013.01); *B29C 49/36* (2013.01); *B65G 2201/0244* (2013.01); *B29C 2049/4221* (2013.01)
USPC ................... 198/463.1; 198/470.1; 198/474.1; 198/478.1; 198/803.9

(58) Field of Classification Search
USPC .......... 198/463.1, 470.1, 474.1, 475.1, 476.1, 198/477.1, 803.3, 803.4, 803.7
See application file for complete search history.

(56) References Cited

U.S. PATENT DOCUMENTS

| 3,548,745 | A | * | 12/1970 | Sirvet et al. ...................... 101/40 |
| 6,779,651 | B1 | | 8/2004 | Linglet et al. |
| 7,140,871 | B2 | * | 11/2006 | Evrard .......................... 425/540 |
| 7,451,868 | B2 | * | 11/2008 | Legallais et al. ........... 198/470.1 |
| 7,849,998 | B2 | * | 12/2010 | Langlois et al. ........... 198/803.9 |
| 8,202,079 | B2 | * | 6/2012 | Litzenberg et al. ........... 425/534 |
| 2007/0256911 | A1 | | 11/2007 | Legallais et al. |
| 2009/0014284 | A1 | * | 1/2009 | Langlois et al. ........... 198/803.9 |

FOREIGN PATENT DOCUMENTS

| EP | 1723060 A1 | 11/2006 |
| JP | 61-259932 | 11/1986 |
| JP | 2003516915 | 5/2003 |
| JP | 2007-526189 | 9/2007 |
| WO | 0144084 A2 | 6/2001 |
| WO | 2005095238 A1 | 10/2005 |

* cited by examiner

*Primary Examiner* — William R Harp
(74) *Attorney, Agent, or Firm* — Pearne & Gordon LLP

(57) ABSTRACT

A device for transferring objects, in particular parisons (3) or bottles (2), has a carousel (10) able to rotate about a predetermined axis (X), an object (2, 3) pick up element (14), a supporting arm (16) for the pick up element (14) connected to the carousel (10), the pick up element (14) having at least three degrees of freedom relative to the carousel (10), a cam (12) for guiding the arm (16) and the pick up element (14), having a predetermined number of tracks (22, 23, 24), for moving the pick up element (14) along a predetermined path (P); the cam (12) has a fixed portion (25) and at least one removable portion (26) connected to the fixed portion (25), the removable portion (26) having a predetermined profile and there being the possibility of substituting it with other removable portions having a different profile to the portion (26).

13 Claims, 9 Drawing Sheets

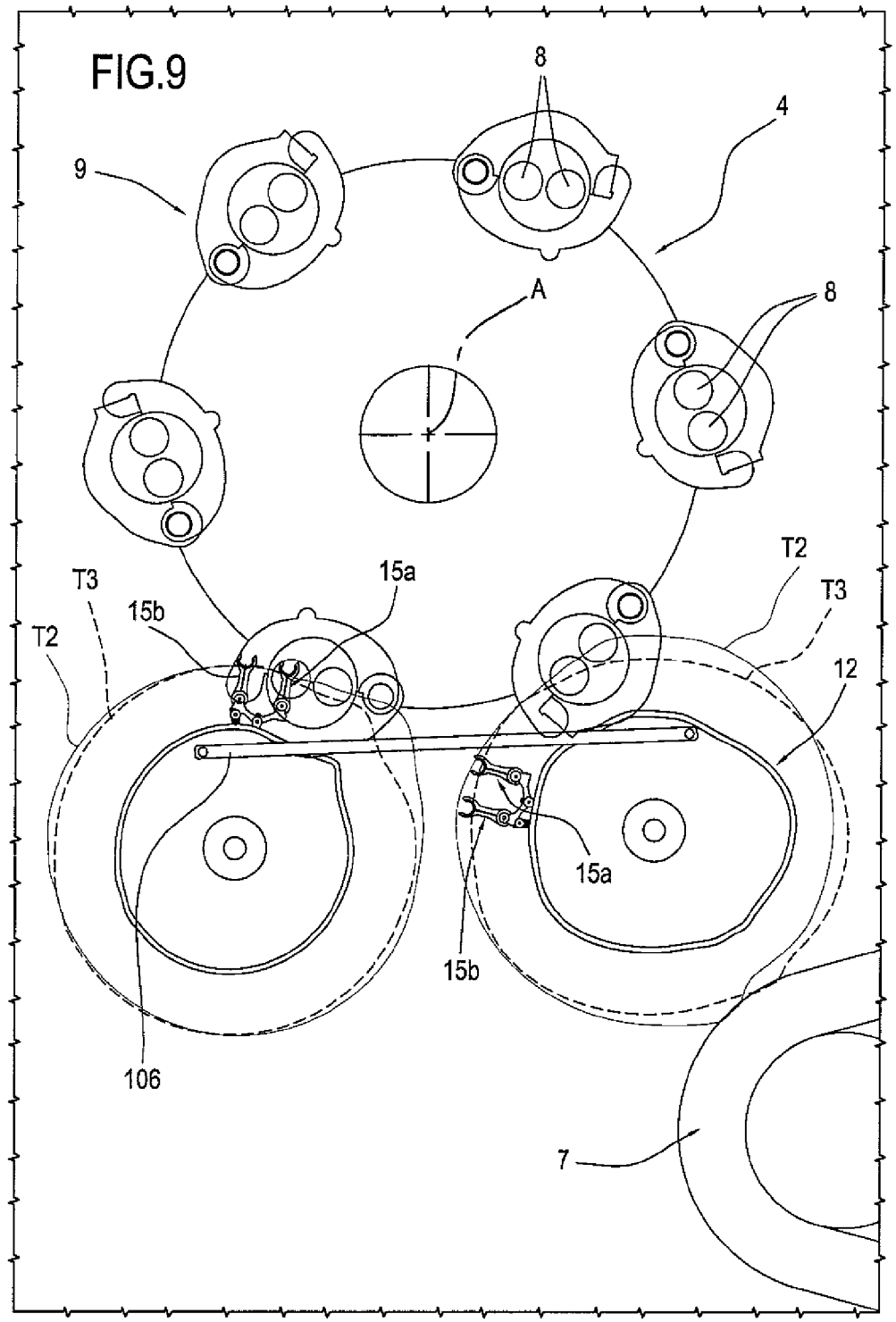

TRANSFER DEVICE

TECHNICAL FIELD

The present invention relates to a device for transferring objects.

In particular, the present invention relates to a device for transferring objects such as plastic parisons and/or bottles comprising a support able to rotate about a substantially vertical axis and supporting at least one pick up arm equipped with at least one gripper designed to hold and move a parison or a bottle.

BACKGROUND ART

As is known, such devices are commonly used in machines for blow-moulding plastic containers in which a parison or a pair of parisons are housed in a mould where, by means of a combined stretching and blowing action, the container or containers is/are produced.

In more detail, said devices are used in rotary type blow-moulding machines, in which the moulds for producing containers are supported by a carousel which rotates about a vertical axis, between a parison loading station, in which a parison or a pair of parisons are inserted in the mould, and a container unloading station, in which the containers formed are picked up from the mould and transferred to subsequent stations.

The mould supporting carousel and, therefore, the moulds themselves, move with a continuous rotary motion, so the above-mentioned transfer devices must be used to perform two different operations: on one hand loading a parison or a pair of parisons in the mould, on the other hand picking up the containers formed from the mould.

To perform said operations, the pick up arm with the respective gripper must be able to perform combined translating and rotating movements so as to "follow" the rotary motion of the mould without interfering with it and at the same time must be able to load the parison or unload the container.

To achieve the above-mentioned combined movements, the supporting device comprises a cam equipped with a number of tracks which varies according to the number of degrees of freedom of the supporting arm.

The supporting arm in turn comprises cam follower wheels, each designed to engage with a respective track, for rotating and translating according to the trajectory which the grippers must follow.

As is known, each parison is picked up by the transfer device from a pre-heating oven and is then inserted in a respective mould by rotation of the transfer device.

In more detail, if the mould has a single cavity and therefore is shaped in such a way that it only houses a single parison, for producing a single container, the pick up arm has a single gripper designed to grasp a parison from the oven and to insert it in the mould. When the arm has a single gripper it must have at least two degrees of freedom to be able to correctly follow the moulds.

If the mould has two cavities and is therefore shaped in such a way that it can house two parisons, for producing two respective containers, each pick up arm is equipped with two grippers. When the arm has two grippers it must have three degrees of freedom to be able to correctly follow the moulds.

In prior art devices, every time it is necessary to pass from a single mould configuration to a double mould configuration the entire transfer device or at least the entire pick up arm guide cam must be substituted.

In particular, in the case of a single mould, the transfer device is equipped with a cam having two tracks (giving the above-mentioned two degrees of freedom of the gripper), whilst in the case of a double mould the transfer device is equipped with a cam having three tracks (giving the above-mentioned three degrees of freedom of the gripper).

Said cam substitution operations are very time consuming and extremely laborious, since a cam may weigh more than 50 kilograms.

Another disadvantage is at the parison loading station.

In the case of double moulds, the oven must also feed twice as many parisons per unit of time. Consequently, the transfer device must be able to pick up double the number of parisons without changing its speed of rotation, since the blow moulds continue to rotate at a constant speed (the presence of the double cavity does not mean that the speed of rotation of the moulds is increased).

For that reason, at the pick up station the grippers must have a tip speed greater than the case in which one parison at a time is fed.

To vary said tip speed, the pick up arm guide cam must again be substituted with the disadvantages described above.

AIM OF THE INVENTION

The present invention therefore has for an aim to provide a transfer device which is easily adaptable both to the production of bottles with single moulds and to the production of bottles with double moulds and which does not involve component substitution operations that are time consuming and require a lot of effort by the operator to move said components.

According to the invention, this aim is achieved by a blow-moulding apparatus, in particular a blow mould, comprising the technical characteristics set out in one or more of the appended claims.

BRIEF DESCRIPTION OF THE DRAWINGS

The technical characteristics of the invention, with reference to the above aims, are clearly described in the claims below and its advantages are more apparent from the detailed description which follows, with reference to the accompanying drawings which illustrate a preferred embodiment of the invention provided merely by way of example without limiting the scope of the inventive concept, and in which:

FIG. 9 is a schematic top plan view with some parts cut away for clarity, of a detail of a plant for blow-moulding bottles, using a device made in accordance with the present invention and equipped in a second configuration.

DETAILED DESCRIPTION OF THE PREFERRED EMBODIMENTS OF THE INVENTION

Figure 1:
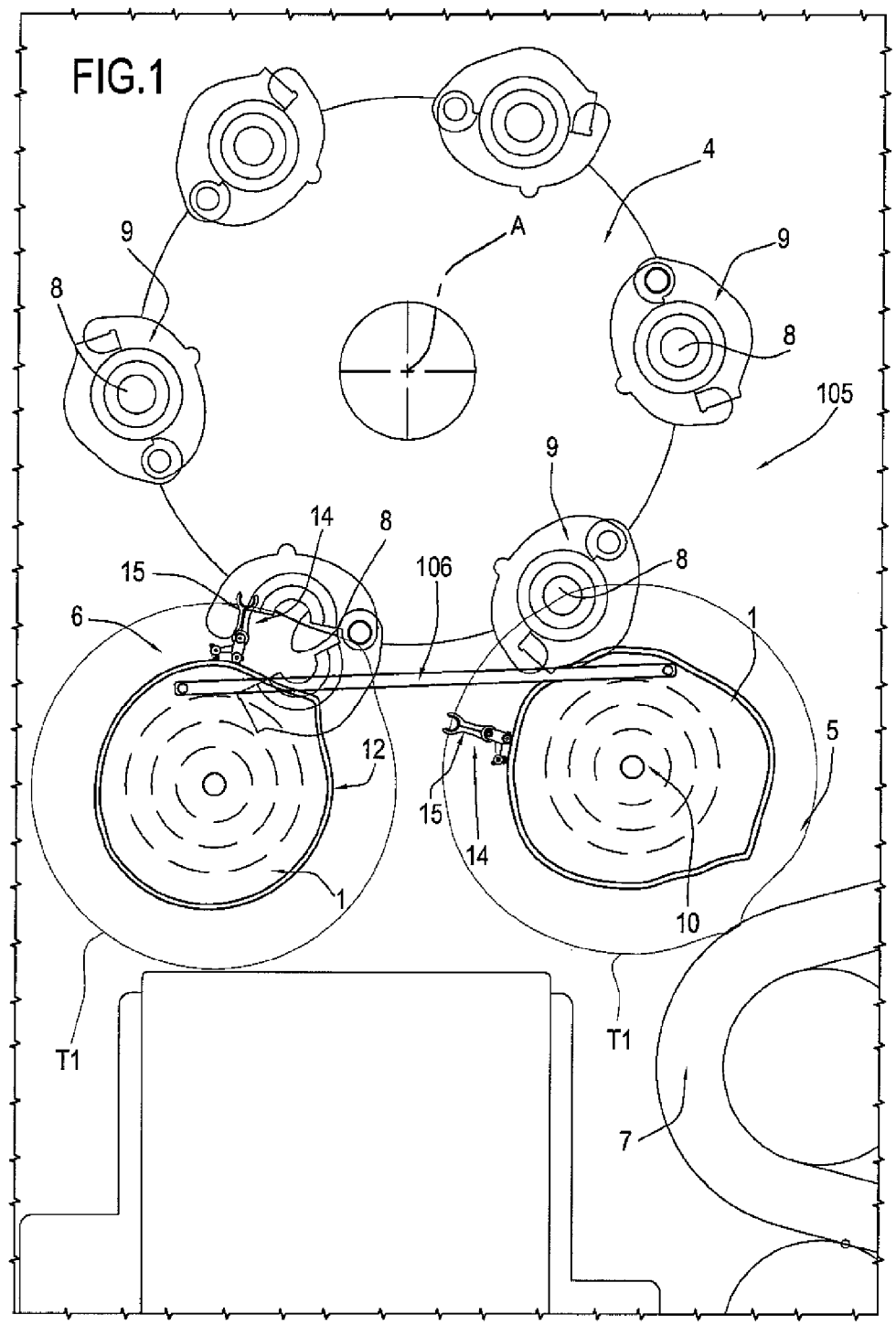
FIG. 1 is a schematic top plan view with some parts cut away for clarity, of a detail of a plant for blow-moulding bottles, using a device made in accordance with the present invention and equipped in a first configuration.

With reference to the accompanying drawings and in particular with reference to FIG. 1, the numeral 1 denotes as a whole a device for transferring objects made in accordance with the present invention.

In particular the device 1 is used in plants 105 for blow-moulding plastic bottles 2, for transferring PET parisons 3 to be blow-moulded and the bottles 2 formed.

The device 1 is advantageously applied at a blow-moulding wheel 4 able to rotate about an axis A, schematically illustrated in FIG. 1.

In more detail, the device 1 is preferably used upstream and downstream of the blow-moulding wheel 4 at a parison 3 loading station 5 and a bottle 2 pick up station 6.

In the parison 3 loading station 5 the device 1 picks up one after another the performs 3 transported from a parison pre-heating oven 7 and inserts each parison 3 in a respective cavity 8 of a mould 9 made to rotate by the blow-moulding wheel 4.

The parisons 3 housed in the mould 9 are blown until they become bottles 2.

The bottles 2 formed in the mould 9 are picked up at the pick up station 6 by a second device 1 adjacent to the blow-moulding wheel 4.

Figure 8:
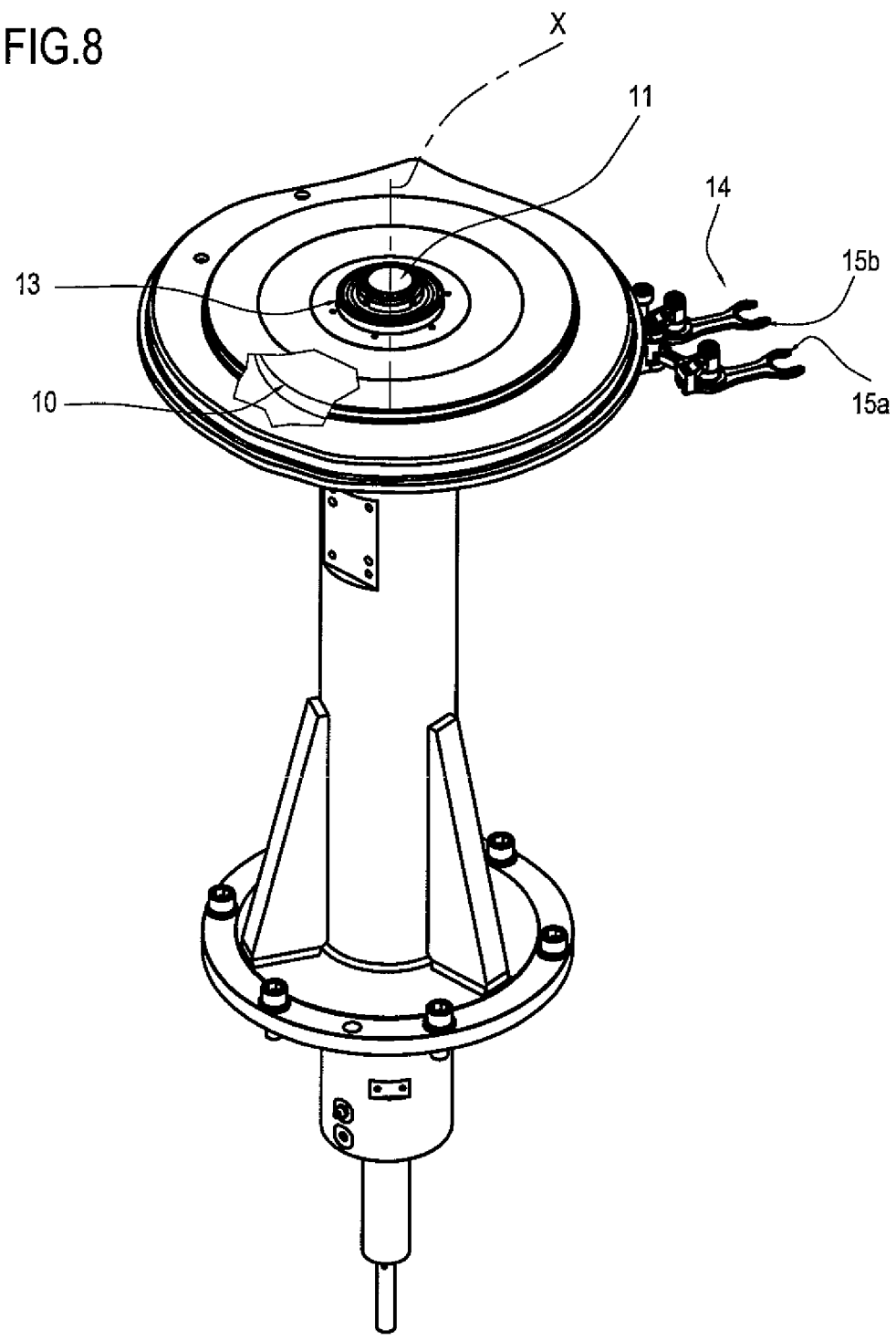
FIG. 8 is a schematic perspective side elevation view of a detail of the device in accordance with the present invention, with some parts cut away to better illustrate others.

As shown in FIGS. 1 and 8, the device 1 comprises a carousel 10 able to rotate about a predetermined axis X.

The carousel 10 is keyed on a shaft 11.

The shaft 11 is rotationally driven by an electric motor, of the known type and therefore not illustrated.

As shown in FIGS. 2, 3, 4 and 8, the device 1 also comprises a cam 12, connected to the shaft 11 with a bearing 13 interposed between them, so that the cam 12 is not drawn in a rotating motion by the shaft 11. The cam is held stationary in position by an anti-rotation rod 106 connected to it, illustrated in FIG. 1.

Advantageously, as shown in FIG. 8, the cam 12 is positioned above the carousel 10, for reasons described in detail below.

The device 1 also comprises a plurality of pick up elements 14 for the parisons 3 and the bottles 2.

In the accompanying drawings, for simplicity, a device 1 with only one pick up element 14 is shown.

The pick up element comprises at least one gripper 15.

The device 1 may be equipped with any number of pick up elements 14.

Figure 2:
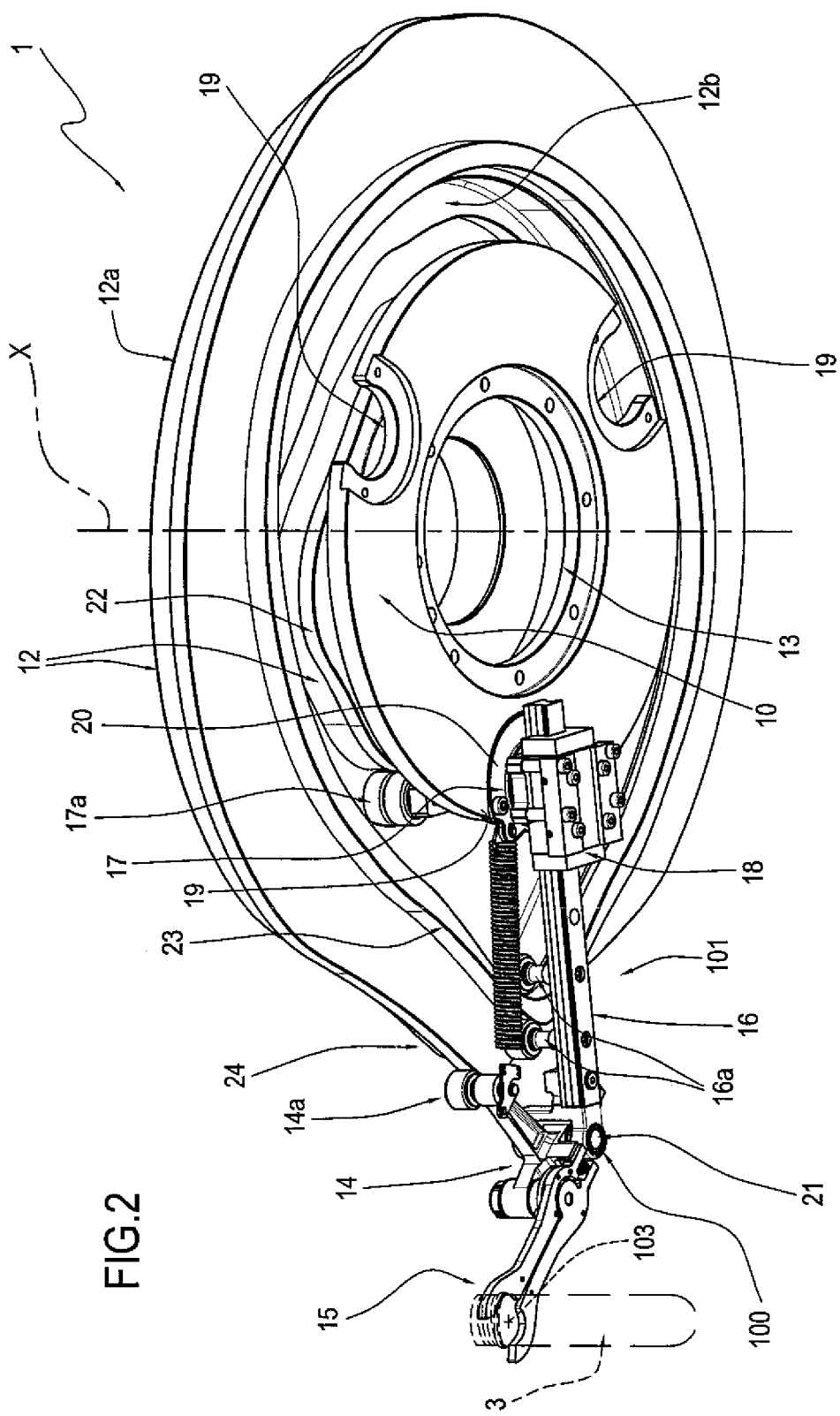
FIG. 2 is a schematic perspective side elevation view with some parts cut away to better illustrate others, of a detail of the device in accordance with the present invention equipped in a first configuration.
Figure 3:
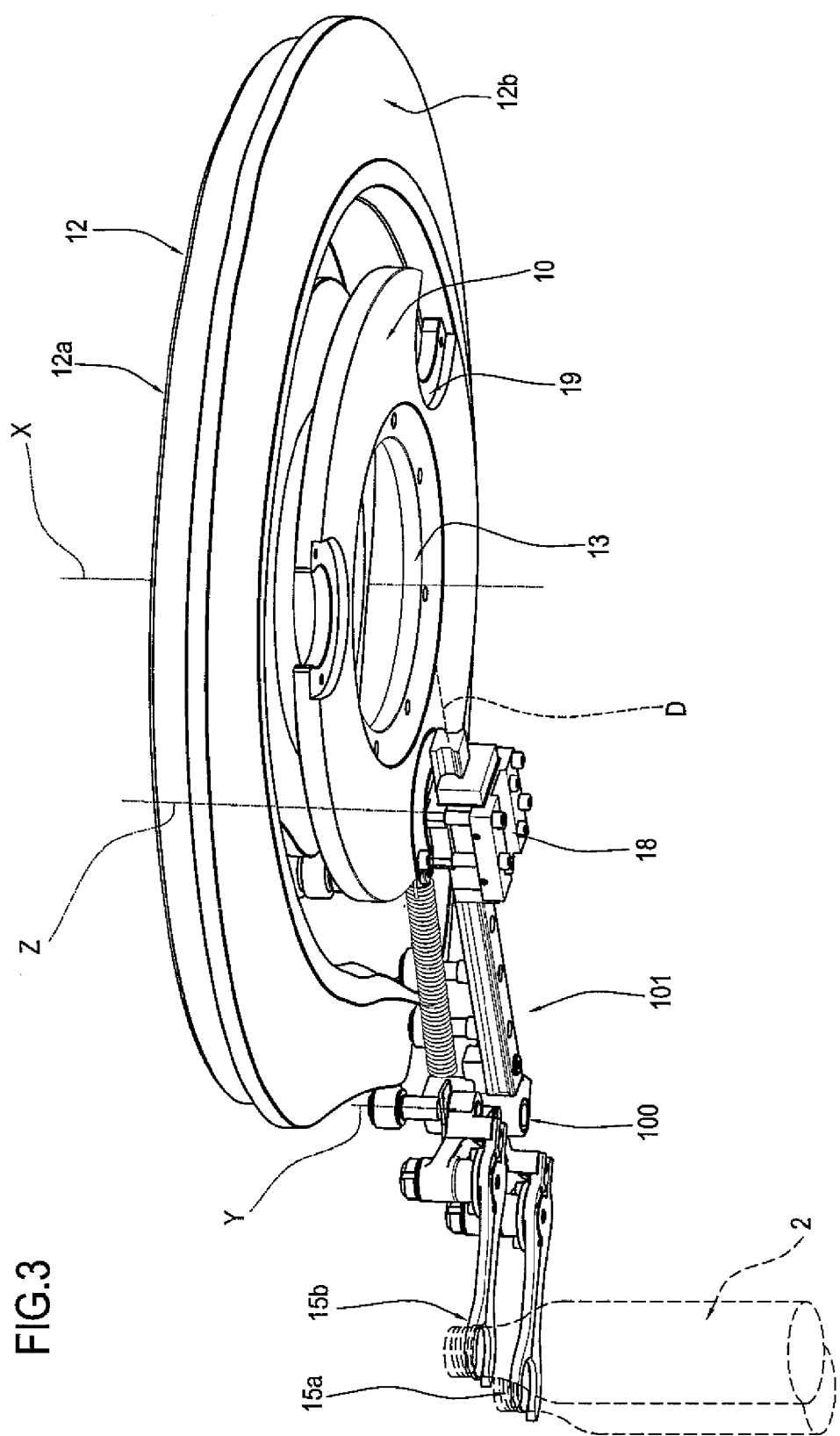
FIG. 3 is a schematic perspective side elevation view with some parts cut away to better illustrate others, of a detail of the device in accordance with the present invention equipped in a second configuration.
Figure 4:
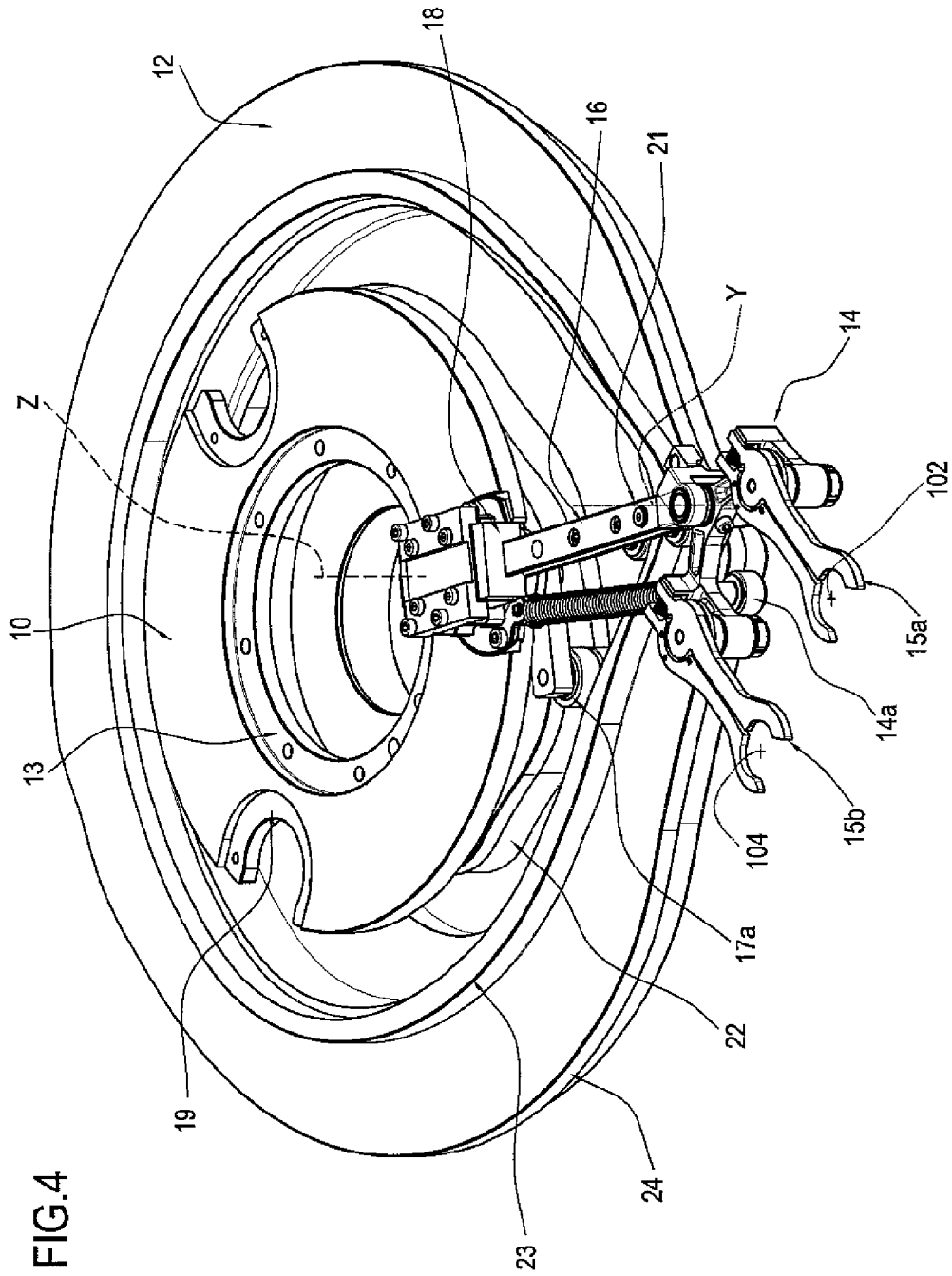
FIG. 4 illustrates the detail of FIG. 3 in a view from a different angle.
Figure 5:
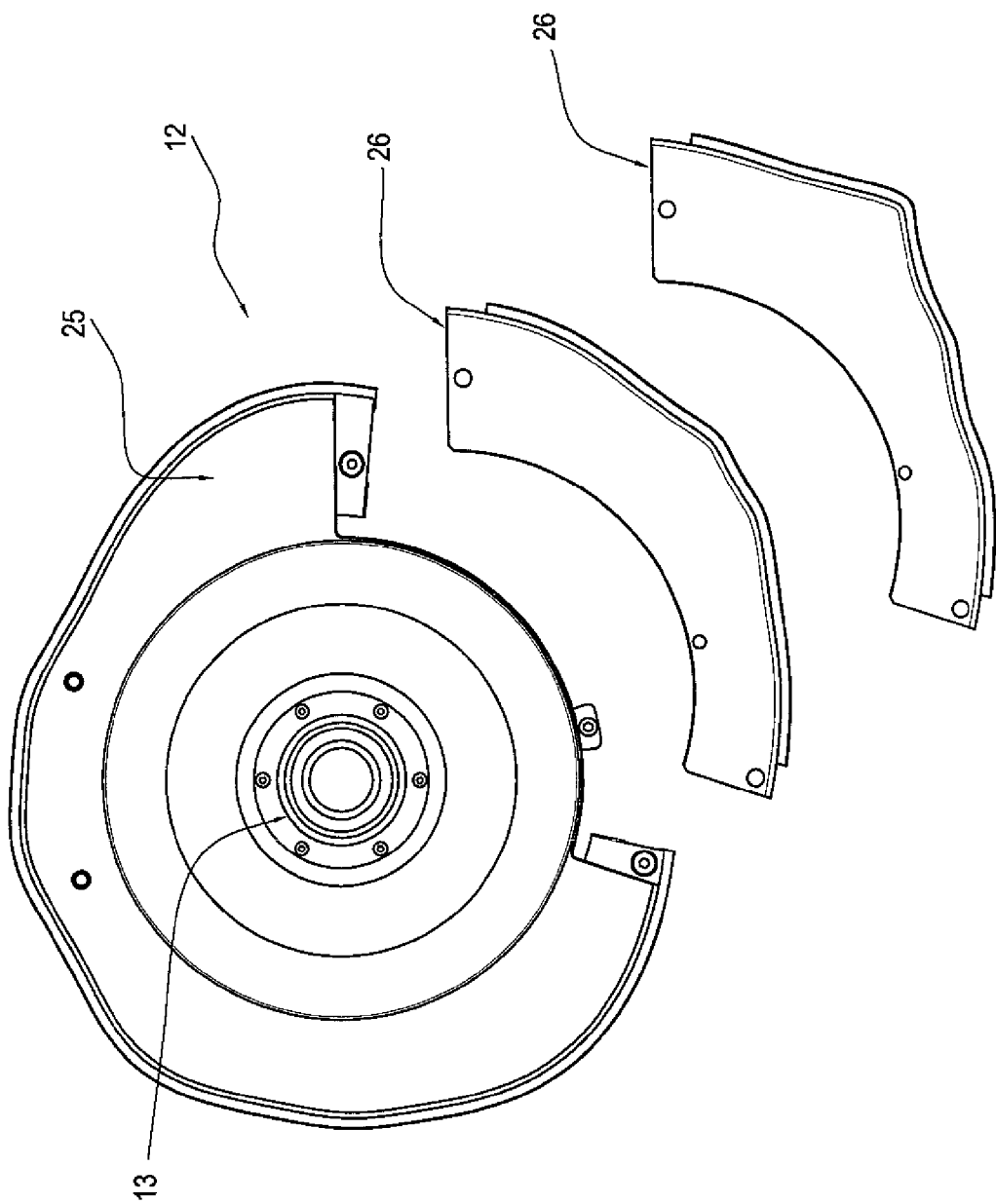
FIG. 5 is a top plan view with some parts exploded for clarity, of a detail of the device made in accordance with the present invention.

In more detail, the pick up element 14 can be configured with a single gripper 15 (as illustrated in FIG. 2), designed to grasp a single parison 3 or a single bottle 2, or with two grippers, a first gripper 15a and a second gripper 15b, respectively (as illustrated in FIGS. 3 and 4), designed to simultaneously grasp a respective pair of parisons 3 or bottles 2.

In particular, the configuration of the pick up element 14 with a single gripper 15 or with two grippers 15a, 15b depends on the type of mould 9 used in the blow-moulding wheel 4.

When a mould 9 with a single cavity 8 is used, the pick up element 14 is configured with a single gripper 15, since only one parison 3 is inserted in and one bottle 2 is formed in each mould 9.

When a mould 9 with two cavities 8 is used, the pick up element 14 is configured with two grippers 15a, 15b, since a pair of parisons 3 is simultaneously inserted in and a pair of bottles 2 is formed in each mould 9.

The device 1 comprises an arm 16 supporting the pick up element 14, and a rotary support 17 designed to connect the arm 16 to the carousel 10.

The arm 16 is connected to the rotary support 17 with a slide 18 interposed between them.

The rotary support 17 is housed in a respective recess 19 made on the outside of the carousel 10, with a bearing 20 interposed between them.

In that way, the arm 16 is free to translate relative to the carousel 10 and to rotate about an axis Z relative to the carousel 10.

The pick up element 14 is connected to the supporting arm 16, at an end portion 21 of the arm 16, by a hinge 100.

The slide 18, the bearing 20, the hinge 100 form a kinematic connection 101 for the arm 16 and the element 14 to the carousel 10.

Therefore, the pick up element 14 is free to rotate relative to the supporting arm 14 about a predetermined axis Y.

Moreover, the pick up element 14 is free to translate relative to the carousel 10 along an axis D identified by the arm 14 and to rotate relative to the carousel 10 about the axis of rotation X of the rotary support 17.

Basically, the pick up element 14 has three degrees of freedom relative to the carousel 10, so that during carousel 10 rotation the pick up element can follow a predetermined path, guided by the cam 12, as described in detail below.

As shown in detail in FIGS. 2, 3, 4, 6 and 7, the cam 12 comprises three tracks, a first track 22, a second track 23 and a third track 24 respectively.

The cam 12 also comprises an upper face 12a and a lower face 12b. The tracks 22, 23, 24 are provided on the lower face 12b of the cam 12, said lower face 12b therefore facing towards the ground.

Each of the three tracks 22, 23, 24 is a looped track and has a predetermined profile designed to guide the pick up element 14 along the above-mentioned path.

In more detail, the path of the pick up element 14 is formed by the combination of translating-rotating movements of the supporting arm 16 relative to the carousel 10 and rotation of the pick up element 14 relative to the supporting arm 16, during carousel 10 rotation about the axis X.

The above-mentioned movements are controlled by the cam 12.

In particular, the rotary support 17 comprises a cam follower wheel 17a designed to engage with the first track 22.

The supporting arm 16 comprises a pair of wheels 16a designed to engage with the second track 23 and to cause the arm 16 translating movement.

The pick up element 14 comprises a respective wheel 14a designed to engage with the third track 24 and to control pick up element 14 rotation relative to the arm 16.

Advantageously, the cam 12 has a profile which is such that it correctly moves the pick up element 14 both if it is configured with a single gripper 15 and if the pick up element 14 comprises two grippers 15a, 15b.

In more detail, when the pick up element 14 is configured with a single gripper 15, the gripper 15 must move along a predetermined first trajectory T1, both to be able to correctly follow the parisons fed by the oven 7 in order to load the parisons 3 on the transfer device 1, and to be able to correctly follow the mould 9 during parison 3 loading in the mould 9 and during bottle 2 pick up from the mould 9.

When the pick up element 14 is configured with two grippers 15a, 15b, each gripper 15a, 15b must follow its own trajectory, in particular a second trajectory T2 and a third trajectory T3. Said two trajectories must be drawn in such a way that the grippers 15a, 15b can correctly follow both the parisons fed by the oven 7 to load the parisons 3 on the transfer device 1, and so that each gripper 15a, 15b follows a respective mould 9 cavity 8, to insert a respective parison 3 in it or pick up a respective bottle 2 from it.

The three cam 12 tracks 22, 23, 24 are shaped in such a way that the gripper 15 or the two grippers 15a, 15b belonging to the pick up element 14 follows the correct respective trajectory T1, T2, T3, during carousel 10 rotation, so that they can grasp/release the parisons 3 and grasp/release the bottles 2.

Advantageously, in that way a single cam 12 can be used both for the pick up element 14 configuration with a single gripper 15 and for the pick up element 14 configuration with two grippers 15a, 15b, avoiding difficult cam 12 substitution operations.

When the pick up element is configured with a single gripper, the gripper 15 defines a first point 103.

When the pick up element is configured with two grippers, the gripper 15a defines a second point 102 and the gripper 15b defines a third point 104.

The second point 102 and the third point 104 form the centre of instantaneous rotation of the gripper 15a and 15b, respectively, when the pick up element 14 is configured with two grippers 15a, 15b.

The first point 103 forms the centre of instantaneous rotation of the single gripper 15 when the pick up element 14 is configured with a single gripper 15.

Each of the three points 102, 103, 104 basically defines the trajectory followed by the respective gripper 15 during device 1 rotation.

The three pick up element 14 guide tracks 22, 23, 24 along the predetermined path are shaped to guide the pick up element 14 along its path in such a way that the three points 102, 103, 104 define three predetermined independent trajectories T1, T2, T3, thus tracking the movement of the moulds 9.

The term "following" the moulds 9 refers to the fact that the centres 102, 103, 104 of instantaneous rotation of each gripper 15 are superposed or almost, by a predetermined blow-moulding wheel 4 angle of rotation, on the axes of the bottles 2 or of the parisons 3, allowing improved exchange of the bottles 2 or parisons 3 during the passage from/to moulds 9-transfer devices 1.

In that way, it is possible to control each gripper 15 independently with a single cam 12, thus making use of a single cam 12 possible for both device 1 configurations (single gripper and two grippers).

Figure 6:
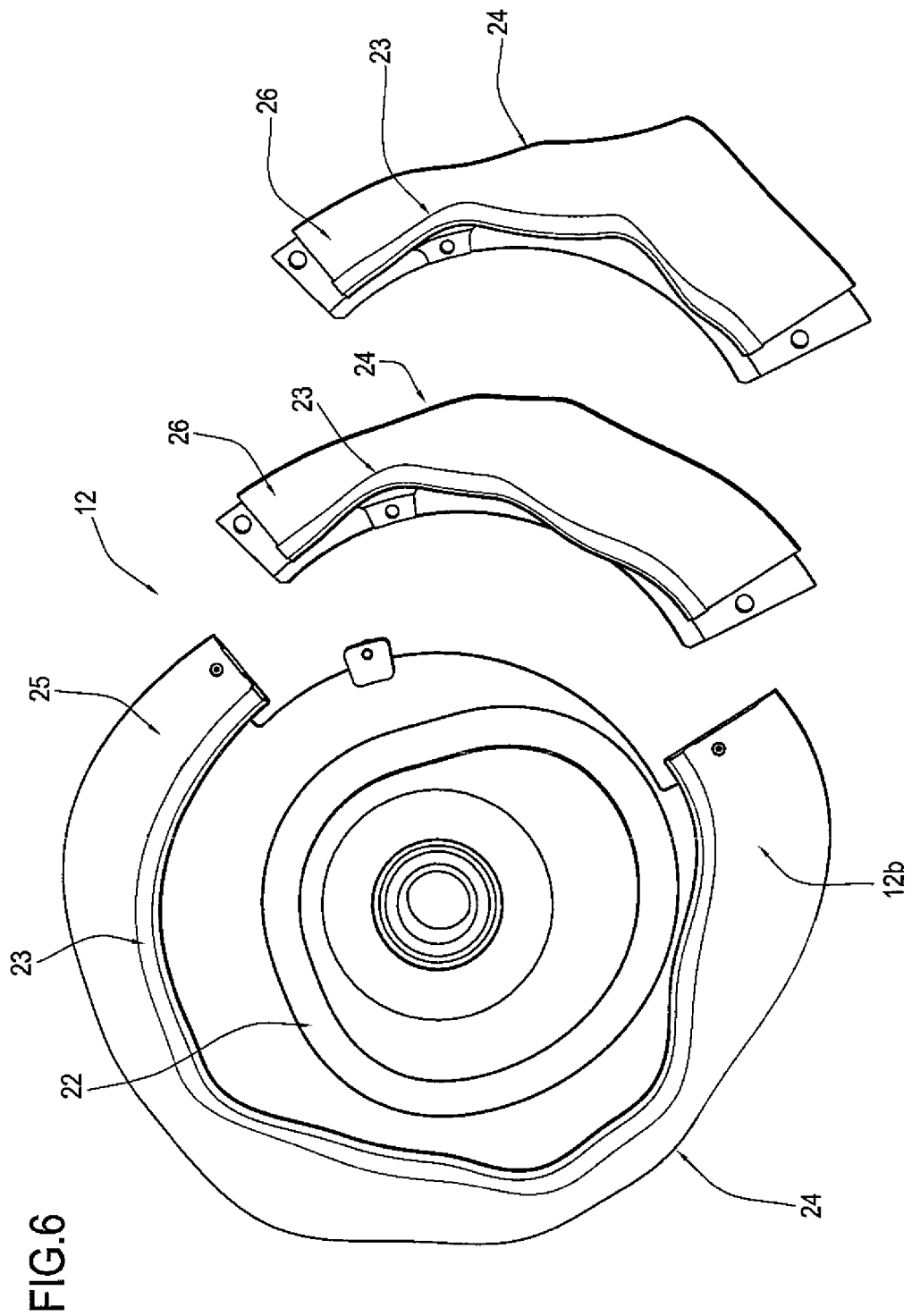
FIG. 6 is a bottom plan view of the detail of FIG. 5.
Figure 7:
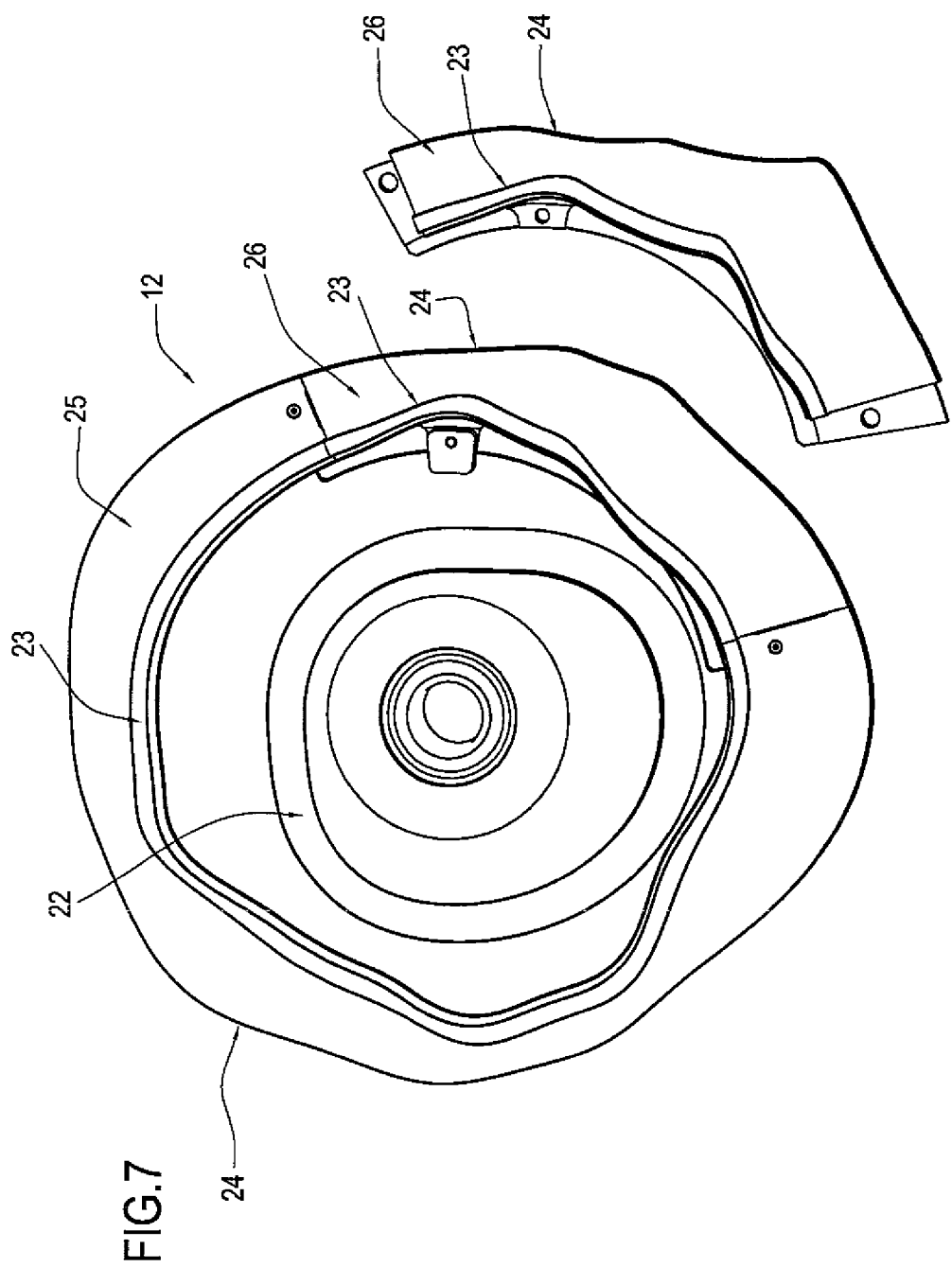
FIG. 7 is a bottom plan view of the detail of FIGS. 5 and 6 with a part exploded for clarity.

As illustrated in FIGS. 6 and 7, the cam 12 comprises an inner track 22, designed to guide arm 16 rotation relative to the carousel 10 and two outer tracks 23, 24 designed to control arm 16 translation relative to the carousel 10 and rotation of the pick up element 14 relative to the arm 16.

The cam 12 also comprises a fixed first portion 25 and a removable second portion 26.

The removable portion 26 has a predetermine profile and can be substituted with other removable portions 26 which have a different profile.

The removable portion 26 is an outer portion of the cam comprising two stretches of the outer tracks 23, 24.

The removable portion 26 is shaped in such a way that it connects to the fixed portion 25 by slotting into it.

The removable portion 26 of the cam 12 is advantageously applied in the device 1 positioned at the parison 3 loading station 5.

The removable portion 26 is positioned adjacent to the parison 3 pre-heating oven 7 for reasons explained in detail below.

In practice, when the mould 9 is equipped with a single cavity 8, the transfer device 1 pick up elements 14 are configured with a single gripper 15.

The oven 7 feeds a series of heated parisons 3 one after another.

The transfer device 1 located at the loading station 5 picks up one parison 3 at a time from the oven 7 and transfers it to the blow-moulding wheel 4, positioning each parison 3 in a respective mould 9 cavity 8.

The mould 9 rotates at a constant speed. Each transfer device 1 pick up element 14 must therefore be able to "follow" the mould 9 to insert its parison 3 in it, without the pick up element 14 gripper 15 interfering with the mould 9.

For that reason, the pick up element 14 can move both by translating and by rotating relative to the carousel 10.

In more detail, with the mould 9 single cavity 8 configuration, the pick up element 14 must have at least two degrees of freedom relative to the carousel 10, in order to be able to correctly insert the parison 3 in the mould 9.

With the mould 9 double cavity 8 configuration, the pick up element 14 must have three degrees of freedom relative to the carousel 10, in order to be able to correctly insert the pair of parisons 3 in the mould 9.

The pick up element 14 degrees of freedom are defined by the kinematic connection between the pick up element 14 and the supporting arm 16 and between the supporting arm 16 and the carousel 10 by means of the slide 18 and the rotary support 17.

The path P followed by the pick up element 14 during carousel 10 rotation is defined by the cam 12 tracks 22, 23, 24.

Advantageously, as already indicated, the cam tracks 22, 23, 24 have a profile such that the pick up element 14 follows the correct path P both if it is configured with a single gripper 15 and if it is configured with two grippers 15a, 15b.

In practice, even in the single gripper configuration, the pick up element has three degrees of freedom and the third degree of freedom does not affect the correct movement of the gripper 15 along the trajectory T1, thanks to the cam profile.

In more detail, a single cam 12 is able to control both the movement of a single central gripper 15, corresponding to the trajectory T1 followed by the point 103, and the movement of two grippers 15a, 15b, corresponding to the trajectories T2, T3 of the points 102, 104, guaranteeing that in both configurations the pick up element 14 can insert the parisons 3 in the mould 9 and pick up the bottles 2 from the mould 9.

Said cam 12 shape is highly advantageous, since it allows the use of a single cam 12 for various plant set-ups, guaranteeing a huge saving in terms of money and effort by the operator who would have had to substitute the entire cam 12 which can weigh more than 50 kg.

When the mould 9 is equipped with a double cavity 8, as shown in FIG. 9, the single gripper 15 is substituted with two grippers 15a, 15b.

In that configuration, the mould 9 continues to rotate at the same constant speed, but the number of parisons 3 for each mould 9 is doubled.

Consequently, the number of parisons 3 which the oven 7 feeds to the transfer device 1 and which the transfer device 1 feeds to each mould 9 must be doubled.

The oven 7 speed is increased so that the number of parisons 3 to be picked up by the device 1 in the unit of time is doubled.

In contrast, the device 1 speed of rotation cannot be increased, since it must follow the speed of rotation of the blow-moulding wheel 4, a speed which remains constant, since the wheel 4 has the same number of moulds but they have double cavities.

For that reason, the relative speed of each pick up element 14 must be increased at the zone where the parisons 3 are picked up from the oven 7.

To do that, the cam 12 profile must be changed at the zone where the parisons 3 are picked up from the oven 7.

Advantageously, according to the present invention, since the cam 12 comprises two portions 25, 26, the portion 26 being removable, in order to change the relative speed of each pick up element 14 at the parison 3 pick up zone, the removable portion 26 of the cam 12 can simply be substituted with a different removable portion having a different profile for the stretches of the tracks 23, 24 which increases the relative speed of the pick up element 14 grippers 15a, 15b at the portion of the cam 12 adjacent to the oven 7.

The invention therefore allows the substitution of just a small component of the cam 12, whose weight is much less than that of the whole cam 12.

Moreover, thanks to the present invention, the warehouse can have just the removable portions 26 of the cam rather than two whole separate cams 12, saving a great deal of money.

The removable portion 26 of the cam 12 is extremely easy to substitute, since it is shaped in such a way that it connects by slotting into the fixed portion 25 of the cam 12.

The invention claimed is:

1. A device for transferring objects, in particular parisons and/or bottles comprising:
   a carousel able to rotate about a predetermined axis;
   a first pick up element and a second pick up element for the objects, for picking up parisons from a pre-heating oven at a parison loading station of the device, positioned adjacent to the pre-heating oven;
   a supporting arm for the first pick up element and the second pick up element connected to the carousel, the first pick up element and the second pick up element having at least three degrees of freedom relative to the carousel;
   a cam for guiding the arm and the first pick up element and the second pick up element, having a predetermined number of tracks, for moving the first pick up element and the second pick up element along a predetermined path, wherein the cam comprises a fixed portion and a first removable portion and a second removable portion selectively connected to the fixed portion,
wherein the first pick up element and the second pick up element are interchangeable one with respect to the other, wherein the first pick up element has a single gripper defining one end point positioned at a first predetermined position with respect to the arm, and the second pick up element has two grippers defining two end points positioned at a second and a third predetermined positions with respect to the arm,
wherein the first removable portion and the second removable portion of the cam are interchangeable one with the other, and wherein the first removable portion has a first predetermined tracks profile, configured to define a path for the end point of the single gripper of the first pick up element, and the second removable portion has a second predetermined tracks profile different from said first predetermined tracks profile, configured to define a path for the end points of the grippers of the second pick up element, wherein the removable portions of the cam are positioned at the parison loading station.

2. The device according to claim 1, wherein the cam forms a loop and comprises an inner track and two outer tracks, and wherein each one of said first and second removable portion is a portion of the cam comprising two segments of two of the tracks.

3. The device according to claim 1, wherein the cam forms a loop and comprises an inner track and two outer tracks, and wherein each one of said first and second removable portion is an outer portion of the cam comprising two segments of the two outer tracks.

4. The device according to claim 1, wherein each one of said first and second removable portion is shaped in such a way that it connects to the fixed portion by slotting into it.

5. The device according to claim 1, wherein the cam is positioned above the arm and the first pick up element and the second pick up element.

6. The device according to claim 5, wherein the cam comprises an upper face and a lower face facing towards the ground, the at least three tracks being provided on the lower face.

7. The device according to claim 1, wherein the first pick up element is configured with said single gripper for grasping a single object and the second pick up element is configured with said two grippers for simultaneously grasping a pair of objects, the cam having a profile such that it moves and operates alternatively the first pick up element with the single gripper and the second pick up element with the two grippers.

8. The device according to claim 1, wherein the first pick up element has a single gripper defining one end point positioned at a first predetermined position with respect to the arm, and the second pick up element has two grippers defining two end points positioned at a second and a third predetermined positions with respect to the arm, and wherein the cam comprises three tracks for guiding the first pick up element and the second pick up element along the path, the three tracks being shaped in such a way to define three predetermined independent trajectories for the corresponding end points, to guide of either the first pick up element or the second pick up element along the path.

9. The device according to claim 8, comprising kinematic connections having a hinge where the first pick up element and the second pick up element is hinged to the arm so that they can rotate relative to the arm, a rotary support connecting the arm to the carousel, so that the arm can rotate relative to the carousel, and a slide interposed between the rotary support and the arm, so that the arm can translate relative to the rotary support and the carousel.

10. A device according to claim 1, wherein the first pick up element is configured with said single gripper for grasping a single object, the gripper following a predetermined trajectory, and wherein the second pick up element is configured with said two grippers for simultaneously grasping a pair of objects, the two grippers being a first gripper and a second gripper, the first gripper following a second trajectory and the second gripper following a third trajectory; and wherein the cam for guiding the arm and the first pick up element and the second pick up element has a predetermined profile, for moving the first pick up element and the second pick up element, alternatively, along a predetermined path, and wherein the cam profile is designed to move the first pick up element and the second pick up element in each of the two configurations so that, when the first pick up element is selected with said single gripper, the gripper travels along said predetermined trajectory and when the second pick up element is selected with said two grippers the first gripper follows the second trajectory and the second gripper follows the third trajectory.

11. The device according to claim 10, wherein the cam comprises three tracks designed to guide the motion of the arm and of the first pick up element and of the second pick up element, the three tracks being shaped in such a way that they guide both the first pick up element with the single gripper, moving the gripper along said predetermined trajectory, and the second pick up element with the two grippers, moving each of the grippers along the second trajectory and the third trajectory, respectively.

12. The device according to claim 10, wherein the cam is positioned above the carousel.

13. The device according to claim 1, wherein the first predetermined tracks profile of the first removable portion of the cam is configured for interacting with the first pick up element and the second pick up element to drive the arm at a first speed, as a function of a rotation speed of the carousel, and wherein the second predetermined tracks profile of the second removable portion of the cam is configured for interacting with the first pick up element and the second pick up element to drive the arm at a second speed, which is different from said first speed, as a function of the rotation speed of the carousel.

* * * * *

UNITED STATES PATENT AND TRADEMARK OFFICE
CERTIFICATE OF CORRECTION

PATENT NO. : 8,925,710 B2
APPLICATION NO. : 13/124576
DATED : January 6, 2015
INVENTOR(S) : Maurizio Borgatti et al.

Page 1 of 1

It is certified that error appears in the above-identified patent and that said Letters Patent is hereby corrected as shown below:

On the title page of the patent, after line (87) entitled "PCT Pub. Date", please insert the date as follows:
-- January 6, 2011 --

Signed and Sealed this
Thirtieth Day of June, 2015

Michelle K. Lee
*Director of the United States Patent and Trademark Office*